United States Patent
Hamada et al.

Patent Number: 5,490,674
Date of Patent: Feb. 13, 1996

[54] THREE-PIECE SOLID GOLF BALL

[75] Inventors: Akihiko Hamada, Kakogawa; Yoshimasa Koizumi; Hidenori Hiraoka, both of Kobe; Yoshikazu Yabuki, Akashi, all of Japan

[73] Assignee: Sumitomo Rubber Industries, Ltd., Hyogo, Japan

[21] Appl. No.: 365,118

[22] Filed: Dec. 28, 1994

[30] Foreign Application Priority Data

Dec. 28, 1993 [JP] Japan .................................. 5-353233

[51] Int. Cl.$^6$ .................................................. A63B 37/06
[52] U.S. Cl. ........................ 273/228; 273/230; 273/235 R
[58] Field of Search ................................. 273/228, 230, 273/235 R, 229, DIG. 22

[56] References Cited

U.S. PATENT DOCUMENTS

| | | | |
|---|---|---|---|
| 4,714,253 | 12/1987 | Nakahara et al. | 273/228 |
| 4,986,545 | 1/1991 | Sullivan | 273/235 R |
| 5,184,828 | 2/1993 | Kim et al. | 273/228 |

FOREIGN PATENT DOCUMENTS

| | | |
|---|---|---|
| 2182340 | 5/1987 | United Kingdom . |
| 2228874 | 12/1990 | United Kingdom . |
| 2247682 | 11/1992 | United Kingdom . |
| 2264302 | 8/1993 | United Kingdom . |

*Primary Examiner*—George J. Marlo
*Attorney, Agent, or Firm*—Birch, Stewart, Kolasch & Birch

[57] ABSTRACT

The present invention provides a solid golf ball having excellent flying performances, stability upon iron shot and good hit feeling.

A solid core 1 comprising an center 1a and an outer shell 1b is coated with a cover 2 to give a three-piece solid golf ball. The center 1a has a diameter of 30.7 to 39.5 mm, a stiffness of 300 to 2,500 kgf/cm$^2$ and a shore D hardness of 30 to 55. The outer layer core 1b has a thickness of 1.0 to 4.0 mm, a stiffness of 2,500 to 6,000 kgf/cm$^2$ and a shore D hardness of 55 to 75. The composition of both cores is a butadiene rubber. The cover 2 has a thickness of 0.6 to 2.0 mm, a stiffness of 1,000 to 2,500 kgf/cm$^2$ and a shore D hardness of 40 to 55. The composition of the cover is an ionomer resin or a mixture of the ionomer resin and a flexible resin.

3 Claims, 1 Drawing Sheet

THREE-PIECE SOLID GOLF BALL

FIELD OF THE INVENTION

The present invention relates to a three-piece solid golf. More particularly, it relates to a three-piece solid golf ball having excellent flying performances, stability upon iron shot and good hit feeling.

BACKGROUND OF THE INVENTION

Recently, a two-piece solid golf ball or a three-piece solid golf ball comprising a cover and a solid core of one or two layers has been particularly popular with average golfers because of its large flying distance.

In the two-piece solid golf ball or three-piece solid golf ball, a high-rigid ionomer resin is normally used as a base resin of the cover so as to enhance impact resilience, thereby increasing flying distance.

However, the two-piece solid golf ball or three-piece solid golf ball using the high-rigid ionomer resin as the base resin of the cover has excellent characteristics that a flying distance is large, but has serious drawbacks as described in the following items (1) and (2).

(1) Since a slip is arisen on the face surface of the iron club at the time of shot, amount of spin largely varies and a flying distance is not stable. Particularly, drop ball, i.e. so-called flyer ball is liable to be arisen because of abnormal deterioration of spin at the time of iron shot from the rough.

(2) Hard hit feeling is obtained at the time of hitting because of the material of the cover, and the hit feeling is inferior.

Therefore, in order to improve the above drawbacks, there have been developed a two-piece solid golf ball using a flexible cover material (see Japanese Kokai Publication Hei 1(1989)-308577).

In the two-piece solid golf ball using a flexible cover material, instability upon iron shot and hard hit feeling caused by the cover have already been solved. However, since a very hard core is used so as to make up for deterioration of impact resilience accompanied with the flexibility of the cover, excessive spin is put on the golf ball, which results in drastic decrease in flying distance. Further, the impact force increases because of hard core, which results in deterioration of hit feeling.

As described above, a conventional two-piece solid golf ball or three-piece solid golf ball has such a drawback that a golf ball attaining a large flying distance is inferior in stability upon iron shot and hit feeling and, on the contrary, a golf ball having good stability upon iron shot and hit feeling attains a short flying distance. Therefore, there has been no golf ball which satisfies flying distance, stability upon iron shot and hit feeling, simultaneously.

OBJECTS OF THE INVENTION

The main object of the present invention is to provide a solid golf ball having excellent flying performances, stability upon iron shot and good hit feeling, simultaneously, which have never been accomplished by a conventional two-piece solid golf ball or three-piece solid golf ball.

This object as well as other objects and advantages of the present invention will become apparent to those skilled in the art from the following description with reference to the accompanying drawing.

SUMMARY OF THE INVENTION

Figure 1:
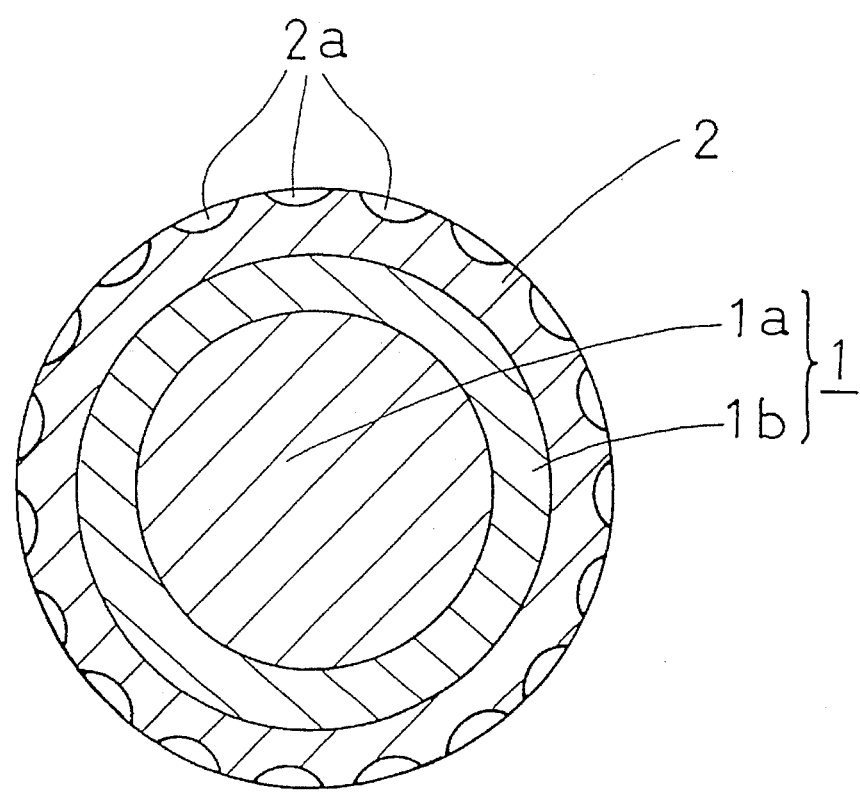
FIG. 1 is a schematic cross section illustrating one embodiment of the three-piece solid golf ball of the present invention.

The present invention provides a three-piece solid golf ball comprising a two-piece solid core and a cover for covering the two-piece solid core, the two-piece solid core being composed of a center and an outer shell covering the center, wherein the center, the outer shell and the cover have the following characteristics respectively:

(1): Center

Diameter: 30.7 to 39.5 mm

Physical properties: stiffness: 300 to 2,500 $kgf/cm^2$
shore D hardness: 30 to 55

Composition: vulcanized rubber obtained from a butadiene rubber, co-crosslinkable monomer, zinc oxide and peroxides as an essential component (2) Outer shell Thickness: 1.0 to 4.0 mm Physical properties: stiffness: 2,500 to 6,000 $kgf/cm^2$
shore D hardness: 55 to 75

Composition: vulcanized rubber obtained from a butadiene rubber, a co-crosslinkable monomer, zinc oxide and peroxides as an essential component (3): Cover Thickness: 0.6 to 2.0 mm Physical properties: stiffness: 1,000 to 2,500 $kgf/cm^2$
shore D hardness: 40 to 55

Composition: cover obtained from an ionomer resin or a mixture of the ionomer resin and a flexible resin as a base resin.

That is, the present invention has succeeded in providing a three-piece solid golf ball having stability upon iron shot, excellent flying performances and good hit feeling by exhibiting characteristics of the above center, outer shell and cover.

(1) Stability upon iron shot

As described above, since a low-rigid and flexible cover material having a stiffness of 1,000 to 2,500 $kgf/cm^2$ and a shore D hardness of 40 to 55 is used as the cover, no slip is arisen at the time of shot and scatter of flying distance is inhibited and, further, stability upon iron shot can be obtained.

(2) Flying performances

By reducing the thickness of the flexible cover which causes deterioration of impact resilience to the utmost and disposing a high-rigid outer shell having excellent impact resilience on the interior of the cover, the impact resilience and initial velocity of the golf ball can be maintained at a suitable level.

Since the high-rigid outer shell is disposed in the vicinity of the exterior of the golf ball and the center has a comparatively large diameter and low rigidity, a local breakage is not arisen in the vicinity of the surface of the golf ball at the time of hitting even if the flexible cover is used, but the whole golf ball is liable to be deformed. Accordingly, since the turning moment, which is produced at a loft of the club when the golf ball is deformed by hitting with the club, becomes small, excessive spin is not arisen and the launch angle becomes large.

That is, regarding the three-piece solid golf ball of the present invention, excessive spin is not arisen even if the flexible cover is used. Therefore, the golf ball has characteristics similar to those of the conventional two-piece solid golf ball using the high-rigid cover in view of initial three elements of flying performances of the golf ball (e.g. initial velocity, launch angle and spin amount), thereby providing a golf ball having a large flying distance.

(3) Hit feeling

Since the center has a low rigidity and is easily deformed, the impact force at the time of hitting is small, thereby affording light hit feeling. Further, good feeling can be obtained by combining with a soft hit feeling of the golf ball with the flexible cover.

DETAILED DESCRIPTION OF THE INVENTION

Next, the construction of the three-piece solid golf ball of the present invention will be explained with reference to the accompanying drawing.

FIG. 1 is a schematic cross section illustrating one embodiment of the three-piece solid golf ball of the present invention. In FIG. 1, 1 is a solid core and the solid core 1 has two layers of a center 1a and an outer shell 1b. Then, 2 is a cover for covering the solid core 1 having the two-layer structure, the cover 2 being provided with a dimple 2a.

Firstly, the cover 2 will be explained. The thickness of the cover 2 is comparatively thin, i.e. 0.6 to 2.0 mm, preferably 0.8 to 1.8 mm. When the thickness of the cover is smaller than 0.6 mm, durability such as cut resistance is deteriorated. On the other hand, when it is larger than 2.0 mm, impact resilience are deteriorated, which results in deterioration of flying distance.

Regarding physical properties of the cover 2, the stiffness is 1,000 to 2,500 kgf/cm$^2$ and the shore D hardness is 40 to 55. The cover 2 has the stiffness lower than the stiffness (about 3,000 to 4,000 kgf/cm$^2$) of the golf ball with high-rigid cover and is flexible so that a slip at the time of iron shot is prevented and good hit feeling can be obtained.

Regarding this cover 2, when the stiffness and shore D hardness are larger than the above range, the flexibility is deteriorated and a slip at the time of iron shot can not be prevented. On the contrary, when they are lower than the above range, deterioration of cut resistance and impact resilience is arisen.

Then, the composition of this cover 2 will be explained. As the base resin of this cover 2, there can be used an ionomer resin having excellent impact resilience and cut resistance or a mixture of the ionomer resin and flexible resin. In the present invention, the latter mixture of the ionomer resin and flexible resin is particularly excellent.

Examples of the ionomer resin include high-rigid ionomer resins and low-rigid ionomer resins. Examples of the high-rigid ionomer resin include Hi-milane #1605, #1707 and #1706 (trade name) which are commercially available from Mitsui Du Pont Polychemical Co., Ltd. Examples of the low-rigid ionomer resin include Hi-milane #1855 and #1856 (trade name).

Examples of the flexible resin include ethylene-isobutyl acrylate-methacrylic acid terpolymer resins such as Nucrel AN42121C and Nucrel NO825J (trade name) which are commercially available from Mitsui Du Pont Polychemical Co., Ltd. Other examples of the flexible resin include ethylene-ethyl acrylate-maleic anhydride terpolymer resins such as Bondine AX8390 and TX8030 (trade name) which are commercially available from Sumitomo Chemical Industries Co., Ltd.

When using only ionomer resin as the base resin of the cover 2, the low-rigid ionomer resin may be used alone (using single low-rigid ionomer resin or mixture of low-rigid ionomer resins) or a mixture of the high-rigid ionomer resin and low-rigid ionomer resin may be used. Also, when using the mixture of the ionomer resin and flexible resin as the base resin of the cover 2, a mixture of the high-rigid ionomer resin and flexible resin may be used or a mixture of the high-rigid ionomer resin, low-rigid ionomer resin and flexible resin may be used. Further, when using various reins in combination, metallic neutralization/modification due to magnesium hydroxide may be suitably provided.

A resin composition for the cover 2 may be prepared by formulating pigments such as titanium dioxide, barium sulfate, etc. and, if necessary, antioxidants into the above ionomer resin or the mixture of ionomer resin and flexible resin as a base resin. Further, it is possible to add a suitable amount (40% by weight or less) of the other resin in the base resin unless characteristics of the base resin are deteriorated.

Hereinafter, the thickness, the physical properties and the composition of the outer shell 1b will be explained.

The thickness of the outer shell 1b is 1.0 to 4.0 mm, preferably 1.5 to 3.5 mm. When the thickness of the outer shell 1b is smaller than 1.0 mm, it is impossible to impart a suitable rigidity to the golf ball and, therefore, desired impact resilience can not be obtained. Further, when the thickness of the outer shell 1b is larger than 4.0 mm, the golf ball becomes too hard and the hit feeling becomes inferior. Further, since the diameter of the center 1a becomes small, the deformation of the golf ball at the time of hitting becomes insufficient and excessive spin is liable to be arisen.

Regarding the physical properties of this outer shell 1b, the stiffness is 2,500 to 6,000 kgf/cm$^2$, preferably 3,000 to 5,500 kgf/cm$^2$ and the shore D hardness is 55 to 75, preferably 58 to 72. As is apparent from these stiffness value and shore D hardness value, the outer shell 1b has a high rigidity and high hardness. Since the outer shell 1b has these physical properties, deterioration of impact resilience and local collapse of the part in the vicinity of the surface at the time of shot are prevented by the flexible cover in thickness of 1 to 4 mm. Thus, excellent flying performances which are one of the feature of the present invention can be obtained.

This outer shell 1b will be explained in the aspect of the composition. That is, this outer shell 1b is composed of a vulcanized rubber of a rubber composition containing a butadiene rubber, a co-crosslinkable monomer, zinc oxide and peroxides.

The outer shell 1b which is hard and superior in impact resilience and durability can be obtained from this rubber composition.

As the butadiene rubber, a high-cis butadiene rubber having a cis content of 80% or more is preferred. If necessary, natural rubber, isoprene rubber, styrene-butadiene rubber, styrene-propylene-diene rubber (EPDM), etc. can be suitably formulated in the base rubber of butadiene rubber to give a rubber component. As is apparent from this description, the rubber component of the outer shell 1b may contain the butadiene rubber as the base rubber, but the base rubber is not limited to the butadiene rubber.

The co-crosslinkable monomer is a monovalent or divalent metallic salt of $\alpha,\beta$-ethylenically unsaturated carboxylic acid. Examples of this co-crosslinkable monomer include zinc diacrylate, basic zinc methacrylate, zinc dimethacrylate and the like. Among them, zinc diacrylate is particularly preferred. The amount of this co-crosslinkable monomer is not specifically limited and is adjusted so that the stiffness and shore D hardness may be within the above range. For example, the stiffness and shore D hardness within the desired range can be obtained by formulating the co-crosslinkable monomer in the amount of 35 to 65 parts by weight based on 100 parts by weight of the rubber component.

The rubber composition of the outer shell 1b contains zinc oxide and peroxides as the constituent component, in addition to the rubber component containing the butadiene rubber as the constituent component and co-crosslinkable monomer. The zinc oxide is used as a supplement crosslinking agent and filler and is normally formulated in the amount of 5 to 25 parts by weight based on 100 parts by weight of the rubber component. Peroxides act as an initiator for crosslinking and graft polymerization of the rubber and co-crosslinkable monomer, and examples thereof include dicumyl peroxide, 1,1-bis(t-butylperoxy)-3,3,5-trimethylcyclohexane and the like. The amount of peroxides is normally 0.2 to 5 parts by weight based on 100 parts by weight of the rubber component.

For example, fillers (e.g. barium sulfate, etc.), antioxidants, additives (e.g. zinc stearate, etc.) may be formulated in the rubber composition for outer shell 1b, if necessary.

Hereinafter, the diameter, the physical properties and the composition of the center 1a will be explained.

The diameter of the center 1a varies depending on the outer diameter of the golf ball [set outer diameter is within a range of 42.7 mm (+0.1 mm, −0.03 mm)] and the thickness of the cover and outer shell, and is 30.7 to 39.5 mm, preferably 33.1 to 38.1 mm.

Regarding the physical properties of this center 1a, the stiffness is 300 to 2,500 kgf/cm$^2$, preferably 500 to 2,300 kgf/cm$^2$ and the shore D hardness is 30 to 55, preferably 32 to 53. As is apparent from these stiffness value and shore D hardness value, the center 1a is comparatively flexible. Since the center 1a has these physical properties, the deformation degree at the time of hitting can be sufficiently increased, thereby decreasing the impact force.

The center 1a is also composed of a vulcanized rubber of a rubber composition containing a butadiene rubber, a co-crosslinkable monomer, zinc oxide and peroxides.

The rubber component and the material of formulation components used for preparing a rubber composition for center 1a are the same as those used for preparing the rubber composition for the outer shell 1b. In order to impart the above-described physical properties such as stiffness, shore D hardness, etc., it is necessary to reduce the amount of the co-crosslinkable monomer in comparison with the outer shell 1b, and the amount of the co-crosslinkable monomer is suitably about 15 to 35 parts by weight based on 100 parts by weight of the rubber component.

The three-piece solid golf ball of the present invention may be prepared, for example, by the following method.

Firstly, a rubber composition for center 1a is normally placed in a mold and subjected to a press molding. The crosslinking condition at the time of press molding is preferably as follows: temperature: 130° to 180° C., time: 10 to 50 minutes. The temperature at the time of press molding is not necessarily constant and it may be changed in two stages or more.

The molding of the outer shell 1b is conducted by laminating a sheet-like rubber composition for outer shell 1a having a desired thickness on an center 1a which has been prepared in advance, followed by press molding, but it is not limited to this method. For example, there can also be used a method comprising molding a couple of half-shells and laminating them each other or a method of molding according to an injection system.

The cover 2 is prepared by covering the solid core 1 having a two-layer structure with a cover composition wherein inorganic oxides such as titanium dioxide, etc., additives such as photostabilizer, etc. are suitably added to the base resin, if necessary. At the time of covering, an injection molding method is normally used but is not specifically limited.

If necessary, desired dimples are formed when the cover is prepared and, after the cover 2 was molded, the golf ball is provided with a painting and stamping, if necessary.

As described above, the three-piece solid golf ball of the present invention having excellent flying performances, stability upon iron shot and good hit feeling.

EXAMPLES

The following Examples and Comparative Examples further illustrate the present invention in detail but are not to be construed to limit the scope thereof.

Examples 1 to 10 and Comparative Examples 1 to 10

Among the above Examples and Comparative Examples, Examples 1 to 10 and Comparative Examples 1 to 8 relate to a three-piece solid golf ball and Comparative Examples 9 to 10 relate to a conventional typical two-piece solid golf ball.

Regarding the three-piece solid golf ball, a rubber composition for center and a rubber composition for outer shell are prepared, respectively, from formulation components described in each table. Then, the rubber composition is crosslinked according to a predetermined condition, and the stiffness and shore D hardness of the resulting crosslinked product are measured. The results are shown in each table. Further, a composition for cover is also prepared from formulation components described in each table, and the stiffness and shore D hardness are measured. The results are shown in each table.

Regarding the two-piece solid golf ball, a rubber composition for core is prepared from formulation components described in Table 16. Then, the rubber composition is crosslinked according to a predetermined condition, and the stiffness and shore D hardness of the resulting crosslinked product are measured. The results are shown in Table 16. Further, a composition for cover is also prepared from formulation components described in Table 17, and the stiffness and shore D hardness are measured. The results are shown in Table 17.

The measuring method of the stiffness and shore D hardness are as follows.

A molded sheet having a thickness of about 2 mm was stored at 23° C. for 2 weeks and the stiffness was measured according to ASTM D-747. The shore D hardness was measured according to ASTM D-2240. In that case, it is difficult to obtain a molded sheet for specimen from the center, outer shell and cover, respectively, so they were prepared as follows.

The molded sheets for specimen of center and outer shell were prepared by subjecting the respective rubber compositions to a heat press molding under the crosslinking condition as described in the table. The molded sheet for specimen of cover was prepared by subjecting the respective cover compositions to a heat press molding as they are.

Amounts in each table are by weight and the common material will be explained only in the first table.

TABLE 1

|  | Example 1 | Example 2 | Example 3 | Example 4 |
|---|---|---|---|---|
| Formulation of center |  |  |  |  |
| Butadiene rubber *1 | 100 | 100 | 100 | 100 |
| Zinc diacrylate | 25 | 25 | 25 | 30 |
| Zinc oxide | 18.5 | 18.5 | 18.5 | 16.5 |
| Antioxidant *2 | 0.5 | 0.5 | 0.5 | 0.5 |
| Dicumyl peroxide | 1.2 | 1.2 | 1.2 | 1.2 |
| Crosslinking condition (°C. × minutes) | 160 × 25 | 160 × 25 | 160 × 25 | 160 × 25 |
| Diameter of center (mm) | 34.9 | 34.9 | 34.9 | 33.9 |
| Stiffness (kgf/cm$^2$) | 1300 | 1300 | 1300 | 1800 |
| Shore D hardness | 44 | 44 | 44 | 49 |

*1: High-cis butadiene rubber JSR BR11 (trade name), manufactured by Nihon Synthetic Rubber Co., Ltd. Mooney viscosity $ML_{1+4}$ (100° C.) = 43
*2: Yoshinox 425 (trade name), manufactured by Yoshitomi Seiyaku Co., Ltd.

TABLE 2

|  | Example 1 | Example 2 | Example 3 | Example 4 |
|---|---|---|---|---|
| Formulation of outer shell |  |  |  |  |
| Butadiene rubber | 100 | 100 | 100 | 100 |
| Zinc diacrylate | 40 | 50 | 60 | 40 |
| Zinc oxide | 12.5 | 9.0 | 5.0 | 12.5 |
| Antioxidant | 0.5 | 0.5 | 0.5 | 0.5 |
| Dicumyl peroxide | 1.5 | 1.5 | 1.5 | 1.5 |
| Crosslinking condition (°C. × minutes) | 160 × 20 | 160 × 20 | 160 × 20 | 160 × 20 |
| Diameter of outer shell (mm) | 2.5 | 2.5 | 2.5 | 3.0 |
| Stiffness (kgf/cm$^2$) | 3000 | 4000 | 4800 | 3000 |
| Shore D hardness | 60 | 65 | 69 | 60 |

TABLE 3

|  | Example 1 | Example 2 | Example 3 | Example 4 |
|---|---|---|---|---|
| Formulation of cover |  |  |  |  |
| Hi-milane #1605 *3 | 20 | 20 | 20 | 20 |
| Hi-milane #1706 *4 | 20 | 20 | 20 | 20 |
| Hi-milane #1855 *5 | 30 | 30 | 30 | 30 |
| Nucrel #AN4212C *6 | 30 | 30 | 30 | 30 |
| Titanium dioxide | 2.0 | 2.0 | 2.0 | 2.0 |
| Barium sulfate | 2.0 | 2.0 | 2.0 | 2.0 |
| Thickness of cover (mm) | 1.4 | 1.4 | 1.4 | 1.4 |
| Stiffness (kgf/cm$^2$) | 1500 | 1500 | 1500 | 1500 |
| Shore D hardness | 49 | 49 | 49 | 4 |

*3: Trade name, ethylene-methacrylic acid ionomer resin obtained by neutralizing with sodium ion, manufactured by Mitsui Du Pont Polychemical Co., MI (melt index) = 2.8, stiffness = 3,100 kgf/cm$^2$
*4: Trade name, ethylene-methacrylic acid ionomer resin obtained by neutralizing with zinc ion, manufactured by Mitsui Du Pont Polychemical Co., Mi (melt index) = 0.8, stiffness = 2,600 kgf/cm$^2$
*5: Trade name, ethylene-acrylate-methacrylic acid ionomer resin obtained by neutralizing with zinc ion, manufactured by Mitsui Du Pont Polychemical Co., MI (melt index) = 1.0, stiffness = 900 kgf/cm$^2$
*6: Trade name, ethylene-isobutyl acrylate-methacrylic acid terpolymer resin, manufactured by Mitsui Du Pont Polychemical Co., MI (melt index) = 12, stiffness = 245 kgf/cm$^2$

TABLE 4

|  | Example 5 | Example 6 | Example 7 | Example 8 |
|---|---|---|---|---|
| Formulation of center |  |  |  |  |
| Butadiene rubber | 100 | 100 | 100 | 100 |
| Zinc diacrylate | 30 | 30 | 20 | 25 |
| Zinc oxide | 16.5 | 16.5 | 21.0 | 17.0 |
| Antioxidant | 0.5 | 0.5 | 0.5 | 0.5 |
| Dicumyl peroxide | 1.2 | 1.2 | 1.2 | 1.2 |
| Crosslinking condition (°C. × minutes) | 160 × 25 | 160 × 25 | 160 × 25 | 160 × 25 |
| Diameter of center (mm) | 35.9 | 35.9 | 34.9 | 35.7 |
| Stiffness (kgf/cm$^2$) | 1800 | 1800 | 700 | 1300 |
| Shore D hardness | 49 | 49 | 37 | 44 |

TABLE 5

|  | Example 5 | Example 6 | Example 7 | Example 8 |
|---|---|---|---|---|
| Formulation of outer shell |  |  |  |  |
| Butadiene rubber | 100 | 100 | 100 | 100 |
| Zinc diacrylate | 50 | 60 | 50 | 50 |
| Zinc oxide | 9.0 | 5.2 | 9.0 | 7.5 |
| Antioxidant | 0.5 | 0.5 | 0.5 | 0.5 |
| Dicumyl peroxide | 1.5 | 1.5 | 1.5 | 1.5 |
| Crosslinking condition (°C. × minutes) | 160 × 20 | 160 × 20 | 160 × 20 | 160 × 20 |
| Diameter of outer shell (mm) | 2.0 | 2.0 | 2.0 | 2.0 |
| Stiffness (kgf/cm$^2$) | 4000 | 4800 | 4000 | 4000 |
| Shore D hardness | 65 | 69 | 65 | 65 |

TABLE 6

|  | Example 5 | Example 6 | Example 7 | Example 8 |
|---|---|---|---|---|
| Formulation of cover |  |  |  |  |
| Hi-milane #1605 | 20 | 20 | 20 | 20 |
| Hi-milane #1706 | 20 | 20 | 20 | 20 |
| Hi-milane #1855 | 30 | 30 | 30 | 30 |
| Nucrel #AN4212C | 30 | 30 | 30 | 30 |
| Titanium dioxide | 2.0 | 2.0 | 2.0 | 2.0 |
| Barium sulfate | 2.0 | 2.0 | 2.0 | 2.0 |
| Thickness of cover (mm) | 1.4 | 1.4 | 1.4 | 1.0 |
| Stiffness (kgf/cm$^2$) | 1500 | 1500 | 1500 | 1500 |
| Shore D hardness | 49 | 49 | 49 | 49 |

TABLE 7

|  | Example 9 | Example 10 |
|---|---|---|
| Formulation of center |  |  |
| Butadiene rubber | 100 | 100 |
| Zinc diacrylate | 25 | 25 |
| Zinc oxide | 18.5 | 19.0 |
| Antioxidant | 0.5 | 0.5 |
| Dicumyl peroxide | 1.2 | 1.2 |
| Crosslinking condition (°C. × minutes) | 160 × 25 | 160 × 25 |
| Diameter of center (mm) | 34.9 | 34.5 |
| Stiffness (kgf/cm$^2$) | 1300 | 1300 |
| Shore D hardness | 44 | 44 |

TABLE 8

|  | Example 9 | Example 10 |
|---|---|---|
| Formulation of outer shell | | |
| Butadiene rubber | 100 | 100 |
| Zinc diacrylate | 50 | 50 |
| Zinc oxide | 9.0 | 10 |
| Antioxidant | 0.5 | 0.5 |
| Dicumyl peroxide | 1.5 | 1.5 |
| Crosslinking condition (°C. × minutes) | 160 × 20 | 160 × 20 |
| Diameter of outer shell (mm) | 2.5 | 2.5 |
| Stiffness (kgf/cm$^2$) | 4000 | 4000 |
| Stiffness (Shore D hardness) | 65 | 65 |

TABLE 9

|  | Example 9 | Example 10 |
|---|---|---|
| Formulation of cover | | |
| Hi-milane #1605 | 25 | 20 |
| Hi-milane #1706 | 25 | 20 |
| Hi-milane #1855 | 20 | 30 |
| Nucrel #AN4212C | 30 | 30 |
| Titanium dioxide | 2.0 | 2.0 |
| Barium sulfate | 2.0 | 2.0 |
| Thickness of cover (mm) | 1.4 | 1.6 |
| Stiffness (kgf/cm$^2$) | 1900 | 1500 |
| Stiffness (Shore D hardness) | 52 | 49 |

TABLE 10

|  | Comparative Example 1 | Comparative Example 2 | Comparative Example 3 | Comparative Example 4 |
|---|---|---|---|---|
| Formulation of center | | | | |
| Butadiene rubber | 100 | 100 | 100 | 100 |
| Zinc diacrylate | 25 | 50 | 25 | 25 |
| Zinc oxide | 18.5 | 9.0 | 18.5 | 18.5 |
| Antioxidant | 0.5 | 0.5 | 0.5 | 0.5 |
| Dicumyl peroxide | 1.2 | 1.5 | 1.2 | 1.2 |
| Crosslinking condition (°C. × minutes) | 160 × 25 | 160 × 25 | 160 × 25 | 160 × 25 |
| Diameter of center (mm) | 34.9 | 34.9 | 27.9 | 34.9 |
| Stiffness (kgf/cm$^2$) | 1300 | 4000 | 1300 | 1300 |
| Shore D hardness | 44 | 65 | 44 | 44 |

TABLE 11

|  | Comparative Example 1 | Comparative Example 2 | Comparative Example 3 | Comparative Example 4 |
|---|---|---|---|---|
| Formulation of outer shell | | | | |
| Butadiene rubber | 100 | 100 | 100 | 100 |
| Zinc diacrylate | 30 | 25 | 50 | 50 |
| Zinc oxide | 16.5 | 18.5 | 9.0 | 9.0 |
| Antioxidant | 0.5 | 0.5 | 0.5 | 0.5 |
| Dicumyl peroxide | 1.2 | 1.2 | 1.2 | 1.2 |
| Crosslinking condition (°C. × minutes) | 160 × 20 | 160 × 20 | 160 × 20 | 160 × 20 |
| Thickness of outer shell (mm) | 2.5 | 2.5 | 6.0 | 2.5 |
| Stiffness (kgf/cm$^2$) | 1800 | 1300 | 4000 | 4000 |
| Shore D hardness | 49 | 44 | 65 | 65 |

TABLE 12

|  | Comparative Example 1 | Comparative Example 2 | Comparative Example 3 | Comparative Example 4 |
|---|---|---|---|---|
| Formulation of cover |  |  |  |  |
| Hi-milane #1605 | 20 | 20 | 20 | 50 |
| Hi-milane #1706 | 20 | 20 | 20 | 50 |
| Hi-milane #1855 | 30 | 30 | 30 | — |
| Nucrel #AN4212C | 30 | 30 | 30 | — |
| Titanium dioxide | 2.0 | 2.0 | 2.0 | 2.0 |
| Barium sulfate | 2.0 | 2.0 | 2.0 | 2.0 |
| Thickness of cover (mm) | 1.4 | 1.4 | 1.4 | 1.4 |
| Stiffness (kgf/cm$^2$) | 1500 | 1500 | 1500 | 3400 |
| Shore D hardness | 49 | 49 | 49 | 63 |

TABLE 13

|  | Comparative Example 5 | Comparative Example 6 | Comparative Example 7 | Comparative Example 8 |
|---|---|---|---|---|
| Formulation of center |  |  |  |  |
| Butadiene rubber | 100 | 100 | 100 | 100 |
| Zinc diacrylate | 25 | 10 | 25 | 20 |
| Zinc oxide | 23.0 | 24.0 | 17.5 | 25.7 |
| Antioxidant | 0.5 | 0.5 | 0.5 | 0.5 |
| Dicumyl peroxide | 1.2 | 1.2 | 1.2 | 1.2 |
| Crosslinking condition (°C. × minutes) | 160 × 25 | 160 × 25 | 160 × 25 | 160 × 25 |
| Diameter of center (mm) | 32.9 | 34.9 | 34.9 | 27.0 |
| Stiffness (kgf/cm$^2$) | 1350 | 200 | 1300 | 800 |
| Shore D hardness | 45 | 28 | 44 | 38 |

TABLE 14

|  | Comparative Example 5 | Comparative Example 6 | Comparative Example 7 | Comparative Example 8 |
|---|---|---|---|---|
| Formulation of outer shell |  |  |  |  |
| Butadiene rubber | 100 | 100 | 100 | 100 |
| Zinc diacrylate | 50 | 50 | 100 | 30 |
| Zinc oxide | 14.0 | 9.0 | 5.0 | 21.0 |
| Antioxidant | 0.5 | 0.5 | 0.5 | 0.5 |
| Dicumyl peroxide | 1.5 | 1.5 | 1.5 | 1.5 |
| Crosslinking condition (°C. × minutes) | 160 × 20 | 160 × 20 | 160 × 20 | 160 × 20 |
| Thickness of outer shell (mm) | 2.5 | 2.5 | 2.5 | 5.5 |
| Stiffness (kgf/cm$^2$) | 4200 | 4000 | 8000 | 1800 |
| Shore D hardness | 66 | 65 | 80 | 49 |

TABLE 15

|  | Comparative Example 5 | Comparative Example 6 | Comparative Example 7 | Comparative Example 8 |
|---|---|---|---|---|
| Formulation of cover |  |  |  |  |
| Hi-milane #1605 | 20 | 20 | 20 | 50 |
| Hi-milane #1706 | 20 | 20 | 20 | 50 |
| Hi-milane #1855 | 30 | 30 | 30 | — |
| Nucrel #AN4212C | 30 | 30 | 30 | — |
| Titanium dioxide | 2.0 | 2.0 | 2.0 | — |
| Barium sulfate | 2.0 | 2.0 | 2.0 | — |
| Thickness of cover (mm) | 2.4 | 1.4 | 1.4 | 2.4 |

TABLE 15-continued

|  | Comparative Example 5 | Comparative Example 6 | Comparative Example 7 | Comparative Example 8 |
| --- | --- | --- | --- | --- |
| Stiffness (kgf/cm²) | 1500 | 1500 | 1500 | 3400 |
| Shore D hardness | 49 | 49 | 49 | 63 |

TABLE 16

|  | Comparative Example 9 | Comparative Example 10 |
| --- | --- | --- |
| Formulation of core |  |  |
| Butadiene rubber | 100 | 100 |
| Zinc diacrylate | 32 | 38 |
| Zinc oxide | 20.5 | 13.5 |
| Antioxidant | 0.5 | 0.5 |
| Dicumyl peroxide | 1.5 | 1.5 |
| Crosslinking condition (°C. × minutes) | 160 × 30 | 160 × 30 |
| Diameter of core (mm) | 37.9 | 39.9 |
| Stiffness (kgf/cm²) | 2050 | 2700 |
| Shore D hardness | 52 | 57 |

TABLE 17

|  | Comparative Example 9 | Comparative Example 10 |
| --- | --- | --- |
| Formulation of cover |  |  |
| Hi-milane #1605 | 50 | 20 |
| Hi-milane #1706 | 50 | 20 |
| Surlyn #AD8265 *7 | — | 60 |
| Titanium dioxide | 2.0 | 2.0 |
| Barium sulfate | 2.0 | 2.0 |
| Thickness of cover (mm) | 2.4 | 1.4 |
| Stiffness (kgf/cm²) | 3400 | 1200 |
| Shore D hardness | 63 | 57 |

*7: Trade name, ethylene-butyl acrylate-methacrylic acid terpolymer soft ionomer resin obtained by neutralizing with sodium ion, manufactured by Du Pont U.S.A. Co., MI = 1.0, shore D hardness = 47, stiffness = 560 kgf/cm²

Three-piece solid golf balls and two-piece solid golf balls of the these Examples and Comparative Examples were prepared as follows.

Regarding the three-piece solid golf ball, a rubber composition for center was firstly prepared from formulation components described in each table, and the resulting rubber composition was charged in a die and subjected to a press molding according to the crosslinking condition described in each table to prepare an center Then, a sheet-like rubber composition for outer shell was laminated on this center and the resulting laminate was subjected to a press molding according to the crosslinking condition described in each table to give a solid core. Then, the solid core was coated with a composition for cover having a formulation described in each table using an injection molding method and, after painting and marking, to prepare a three-piece solid golf ball having an outer diameter of 42.7 mm.

Regarding the two-piece solid golf ball, a rubber composition for core was prepared from formulation components described in Table 16, and the resulting rubber composition was charged in a die and subjected to a press molding according to the crosslinking condition described in Table 16 to prepare a solid core. Then, the solid core was coated with a composition for cover having a formulation described in Table 17 using an injection molding method and, after painting and marking, to prepare a two-piece solid golf ball having an outer diameter of 42.7 mm.

The ball weight of the resulting golf ball, the ball initial velocity, the spin and the flying distance (carry) obtained by hitting with a No.1 wood club and a No.9 iron club, and the maximum impact force obtained by hitting with a No.1 wood club were measured.

Regarding the No.9 iron club test, a test was also conducted at the state where a shot mark of a pressure-sensitive paper is adhered on the face surface as the condition wherein a slip is liable to be generated, in addition to the test at a normal state, thereby examining a slip prevention effect at the time of iron shot.

The initial velocity, the spin, the launch angle and the flying distance (carry) were measured by hitting with a No.1 wood club (No.9 iron club) at a head speed of 45 m/second (34.5 m/second) using a swing robot manufactured by True Temper Co.

The maximum impact force was determined by hitting a golf ball with a No.1 wood club of which back surface section of the club head was equipped with an acceleration pickup to measure an acceleration generated in the opposite direction to the forward direction of the head and converting the maximum acceleration into a force.

Further, the hit feeling and the control properties of the resulting golf ball were evaluated according to a practical hitting test by 10 top professional golfers. The evaluation criteria are as follows. The evaluation results are also shown in each table by the same symbol and are based on the fact that not less than 8 out of 10 golfers evaluated with the same criterion.

Evaluation criteria

○: Good, hit feeling and control properties are excellent.

Δ: Control properties are good but it is too hard and the impact is too strong, or it is too soft and heavy, and the hit feeling is inferior.

×: Hit feeling and control properties are inferior, simultaneously.

These evaluation results of the golf balls are shown in Tables 18 to 29. Further, "No.9 iron test (1)" means the case that a test is conducted by hitting with a No.9 iron club at a normal state where the face surface is dry. Further, "No.9 iron test (2)" means the case that a test is conducted by hitting with a No.9 iron club at the state where a pressure-sensitive paper "Lite G-42 (trade name)" manufactured by Raito Co., Ltd. is adhered on the face surface on hitting. Furthermore, "difference between No.9 iron test (1) and (2)" means a difference in initial spin and flying distance between test (1) and (2) (test (1)–test (2)).

The results thus obtained are shown in Tables 18 to 29. In Tables 18 to 19, various characteristics of the golf balls of Examples 1 to 4 are shown. In Tables 20 to 21, various characteristics of the golf balls of Examples 5 to 8 are shown. In Tables 22 to 23, various characteristics of the golf balls of Examples 9 to 10 are shown. In Tables 24 to 25, various characteristics of the golf balls of Comparative Examples 1 to 4 are shown. In Tables 26 to 27, various characteristics of the golf balls of Comparative Examples 5 to 8 are shown. In Tables 28 to 29, various characteristics of the golf balls of Comparative Examples 9 to 10 are shown.

TABLE 18

|  | Example 1 | Example 2 | Example 3 | Example 4 |
|---|---|---|---|---|
| Ball weight (g) | 45.4 | 45.4 | 45.5 | 45.4 |
| Flying performances when using No. 1 wood club | | | | |
| Ball initial velocity (m/s) | 65.0 | 65.1 | 65.2 | 65.2 |
| Initial spin (rpm) | 2,700 | 2,800 | 2,900 | 3,000 |
| Launch angle (degree) | 11.6 | 11.5 | 11.4 | 11.3 |
| Flying distance (yard) | 230 | 233 | 231 | 230 |
| No. 9 iron club test (1) | | | | |
| Ball initial velocity (m/s) | 43.0 | 43.2 | 43.3 | 43.3 |
| Initial spin (rpm) | 8,200 | 8,300 | 8,400 | 8,400 |
| Launch angle (degree) | 24.5 | 24.4 | 24.4 | 24.3 |
| Flying distance (yard) | 124 | 124 | 124 | 123 |
| No. 9 iron club test (2) | | | | |
| Ball initial velocity (m/s) | 43.0 | 43.2 | 43.3 | 43.3 |
| Initial spin (rpm) | 8,100 | 8,100 | 8,200 | 8,200 |
| Launch angle (degree) | 24.6 | 24.4 | 24.5 | 24.4 |
| Flying distance (yard) | 125 | 125 | 125 | 124 |

TABLE 19

|  | Example 1 | Example 2 | Example 3 | Example 4 |
|---|---|---|---|---|
| Difference between No. 9 iron club test (1) and test (2) | | | | |
| Initial spin (rpm) | −100 | −200 | −200 | −200 |
| Flying distance (yard) | +1 | +1 | +1 | +1 |
| Maximum impact force (kgf) | 1,450 | 1,500 | 1,550 | 1,550 |
| Hit feeling and control properties | ○ | ○ | ○ | ○ |

TABLE 20

|  | Example 5 | Example 6 | Example 7 | Example 8 |
|---|---|---|---|---|
| Ball weight (g) | 45.4 | 45.5 | 45.4 | 45.5 |
| Flying performances when using No. 1 wood club | | | | |
| Ball initial velocity (m/s) | 65.2 | 65.3 | 64.9 | 65.0 |
| Initial spin (rpm) | 2,900 | 2,900 | 2,700 | 2,700 |
| Launch angle (degree) | 11.4 | 11.4 | 11.6 | 11.6 |
| Flying distance (yard) | 231 | 233 | 230 | 231 |
| No. 9 iron club test (1) | | | | |
| Ball initial velocity (m/s) | 43.3 | 43.4 | 43.1 | 43.2 |
| Initial spin (rpm) | 8,300 | 8,300 | 8,100 | 8,200 |
| Launch angle (degree) | 24.4 | 24.4 | 24.7 | 24.5 |
| Flying distance (yard) | 124 | 124 | 125 | 125 |
| No. 9 iron club test (2) | | | | |
| Ball initial velocity (m/s) | 43.3 | 43.4 | 43.1 | 43.2 |
| Initial spin (rpm) | 8,100 | 8,200 | 8,100 | 8,100 |
| Launch angle (degree) | 24.5 | 24.4 | 24.8 | 24.6 |
| Flying distance (yard) | 125 | 124 | 125 | 125.5 |

TABLE 21

|  | Example 5 | Example 6 | Example 7 | Example 8 |
|---|---|---|---|---|
| Difference between No. 9 iron club test (1) and test (2) | | | | |
| Initial spin (rpm) | −200 | −100 | 0 | −100 |
| Flying distance (yard) | +1 | 0 | 0 | +0.5 |
| Maximum impact force (kgf) | 1,600 | 1,650 | 1,400 | 1,550 |
| Hit feeling and control properties | ○ | ○ | ○ | ○ |

TABLE 22

|  | Example 9 | Example 10 |
|---|---|---|
| Ball weight (g) | 45.4 | 45.4 |
| Flying performances when using No. 1 wood club | | |
| Ball initial velocity (m/s) | 65.2 | 65.0 |
| Initial spin (rpm) | 2,900 | 2,800 |
| Launch angle (degree) | 11.6 | 11.5 |
| Flying distance (yard) | 232 | 232 |
| No. 9 iron club test (1) | | |
| Ball initial velocity (m/s) | 43.3 | 43.1 |
| Initial spin (rpm) | 8,400 | 8,300 |
| Launch angle (degree) | 24.5 | 24.4 |
| Flying distance (yard) | 124 | 124 |
| No. 9 iron club test (2) | | |
| Ball initial velocity (m/s) | 43.3 | 43.1 |
| Initial spin (rpm) | 8,200 | 8,200 |
| Launch angle (degree) | 24.6 | 24.5 |
| Flying distance (yard) | 125 | 125 |

TABLE 23

|  | Example 9 | Example 10 |
|---|---|---|
| Difference between No. 9 iron club test (1) and test (2) | | |
| Initial spin (rpm) | −200 | −100 |
| Flying distance (yard) | +1 | +1 |
| Maximum impact force (kgf) | 1,600 | 1,450 |
| Hit feeling and control properties | ○ | ○ |

TABLE 24

|  | Comparative Example 1 | Comparative Example 2 | Comparative Example 3 | Comparative Example 4 |
|---|---|---|---|---|
| Ball weight (g) | 45.4 | 45.4 | 45.4 | 45.5 |
| Flying performances when using No. 1 wood club | | | | |
| Ball initial velocity (m/s) | 64.3 | 65.2 | 65.2 | 65.3 |
| Initial spin (rpm) | 2,600 | 3,800 | 3,300 | 2,700 |
| Launch angle (degree) | 11.6 | 10.7 | 11.1 | 11.7 |
| Flying distance (yard) | 225 | 222 | 228 | 232 |
| No. 9 iron club test (1) | | | | |
| Ball initial velocity (m/s) | 42.6 | 43.2 | 43.2 | 43.3 |
| Initial spin (rpm) | 8,000 | 10,500 | 9,200 | 8,000 |
| Launch angle (degree) | 24.3 | 21.5 | 22.8 | 24.7 |
| Flying distance (yard) | 118 | 116 | 120 | 125 |
| No. 9 iron club test (2) | | | | |
| Ball initial velocity (m/s) | 42.6 | 43.3 | 43.2 | 43.3 |
| Initial spin (rpm) | 7,900 | 10,200 | 9,000 | 5,800 |
| Launch angle (degree) | 24.4 | 21.7 | 22.9 | 25.7 |
| Flying distance (yard) | 119 | 117 | 121 | 132 |

TABLE 25

|  | Comparative Example 1 | Comparative Example 2 | Comparative Example 3 | Comparative Example 4 |
|---|---|---|---|---|
| Difference between No. 9 iron club test (1) and test (2) | | | | |
| Initial spin (rpm) | −100 | −300 | −200 | −2,200 |
| Flying distance (yard) | +1 | +1 | +1 | +7 |
| Maximum impact force (kgf) | 1,400 | 2,200 | 1,900 | 1,650 |
| Hit feeling and control properties | ○ | Δ | Δ | x |

TABLE 26

|  | Comparative Example 5 | Comparative Example 6 | Comparative Example 7 | Comparative Example 8 |
|---|---|---|---|---|
| Ball weight (g) | 45.4 | 45.4 | 45.5 | 45.4 |
| Flying performances when using No. 1 wood club | | | | |
| Ball initial velocity (m/s) | 64.6 | 64.2 | 65.2 | 64.9 |
| Initial spin (rpm) | 3,200 | 2,600 | 3,000 | 2,700 |
| Launch angle (degree) | 11.2 | 11.5 | 11.3 | 11.7 |
| Flying distance (yard) | 225 | 224 | 230 | 230 |
| No. 9 iron club test (1) | | | | |
| Ball initial velocity (m/s) | 42.9 | 42.5 | 43.2 | 43.1 |
| Initial spin (rpm) | 9,000 | 8,100 | 8,500 | 8,000 |
| Launch angle (degree) | 23.0 | 24.4 | 24.2 | 24.6 |
| Flying distance (yard) | 119 | 118 | 122 | 124 |
| No. 9 iron club test (2) | | | | |
| Ball initial velocity (m/s) | 43.0 | 42.5 | 43.2 | 43.1 |
| Initial spin (rpm) | 9,000 | 8,000 | 8,300 | 5,900 |
| Launch angle (degree) | 23.2 | 24.4 | 24.6 | 25.7 |
| Flying distance (yard) | 119 | 118 | 123 | 131 |

TABLE 27

|  | Comparative Example 5 | Comparative Example 6 | Comparative Example 7 | Comparative Example 8 |
|---|---|---|---|---|
| Difference between No. 9 iron club test (1) and test (2) | | | | |
| Initial spin (rpm) | 0 | −100 | −200 | −2,100 |
| Flying distance (yard) | +1 | 0 | +1 | +7 |
| Maximum impact force (kgf) | 1,500 | 1,300 | 1,900 | 1,550 |
| Hit feeling and control properties | ○ | ○ | Δ | x |

TABLE 28

|  | Comparative Example 9 | Comparative Example 10 |
|---|---|---|
| Ball weight (g) | 45.5 | 45.4 |
| Flying performances when using No. 1 wood club | | |
| Ball initial velocity (m/s) | 65.1 | 64.5 |
| Initial spin (rpm) | 2,800 | 3,500 |
| Launch angle (degree) | 11.5 | 11.0 |
| Flying distance (yard) | 232 | 223 |
| No. 9 iron club test (1) | | |
| Ball initial velocity (m/s) | 43.2 | 42.8 |
| Initial spin (rpm) | 8,300 | 9,600 |
| Launch angle (degree) | 24.4 | 22.5 |
| Flying distance (yard) | 123 | 11 8 |
| No. 9 iron club test (2) | | |
| Ball initial velocity (m/s) | 43.2 | 42.9 |
| Initial spin (rpm) | 6,300 | 9,400 |
| Launch angle (degree) | 25.4 | 22.6 |
| Flying distance (yard) | 129 | 118.5 |

TABLE 29

|  | Comparative Example 9 | Comparative Example 10 |
| --- | --- | --- |
| Difference between No. 9 iron club test (1) and test (2) | | |
| Initial spin (rpm) | −2,000 | −200 |
| Flying distance (yard) | +6 | +0.5 |
| Maximum impact force (kgf) | 1,600 | 1,950 |
| Hit feeling and control properties | x | Δ |

As is apparent from the results shown in the above tables, since the golf bails of Examples 1 to 10 have suitable ball initial velocity, initial spin and launch angle, they exhibited the flying distance which compares with that of the golf balls using the high-rigid cover of Comparative Examples 8 and 9. As is apparent from the fact that the difference between No.9 iron club test (1) and (2), i.e. difference in initial spin and flying distance between tests wherein the shot mark is provided on the No.9 iron club or not is small, the stability upon iron shot was accomplished and they had low impact force, good hit feeling and control properties.

On the contrary, the golf balls of Comparative Examples 1 to 7 were inferior in flying distance, stability upon iron shot or hit feeling.

Further, the three-piece solid golf ball using the high-rigid hard cover of Comparative Example 8 and the typical two-piece solid golf ball using the same high-rigid hard cover of Comparative Example 9 attained large flying distance, but the stability upon iron shot and control properties were inferior. Further, the hit feeling was also inferior because of hardness of the cover.

Regarding the typical two-piece solid golf ball using the flexible cover of Comparative Example 10, scatter of iron shot was small and control properties were good, but the flying distance is drastically deteriorated due to excessive slip. Further, the impact force at the time of hitting was large and the hit feeling was not good.

What is claimed is:

1. A three-piece solid golf ball comprising a two-piece solid core and a cover for covering the two-piece solid core, said two-piece solid core being composed of a center and an outer shell covering said center, wherein the center, the outer shell and the cover have the following characteristics respectively:

(1): Center

Diameter: 30.7 to 39.5 mm

Physical properties: stiffness: 300 to 2,500 $kgf/cm^2$ shore D hardness: 30 to 55

Composition: vulcanized rubber obtained from a butadiene rubber, co-crosslinkable monomer, zinc oxide and peroxides as an essential component (2) Outer shell Thickness: 1.0 to 4.0 mm Physical properties: stiffness: 2,500 to 6,000 $kgf/cm^2$ shore D hardness: 55 to 75

Composition: vulcanized rubber obtained from a butadiene rubber, a co-crosslinkable monomer, zinc oxide and peroxides as an essential component (3): Cover Thickness: 0.6 to 2.0 mm Physical properties: stiffness: 1,000 to 2,500 $kgf/cm^2$ shore D hardness: 40 to 55

Composition: cover obtained from an ionomer resin or a mixture of the ionomer resin and a flexible resin as a base resin.

2. The three-piece solid golf ball according to claim 1, wherein the co-crosslinkable monomer is zinc diacrylate, an amount of zinc diacrylate to be formulated in the outer shell is 35 to 65 parts by weight based on 100 parts by weight of the rubber component and an amount of zinc diacrylate to be formulated in the center is 15 to 35 parts by weight based on 100 parts by weight of the rubber component.

3. The three-piece solid golf ball according to claim 1, wherein the flexible resin of the cover is α-olefin-α, β-unsaturated carboxylate-unsaturated carboxylic acid terpolymer resin.

* * * * *